Feb. 13, 1934.    A. H. BRANDON    1,946,832
FAUCET ADAPTER
Filed March 11, 1931    2 Sheets-Sheet 1

Inventor
A. H. Brandon
by Hazard and Miller
Attorneys

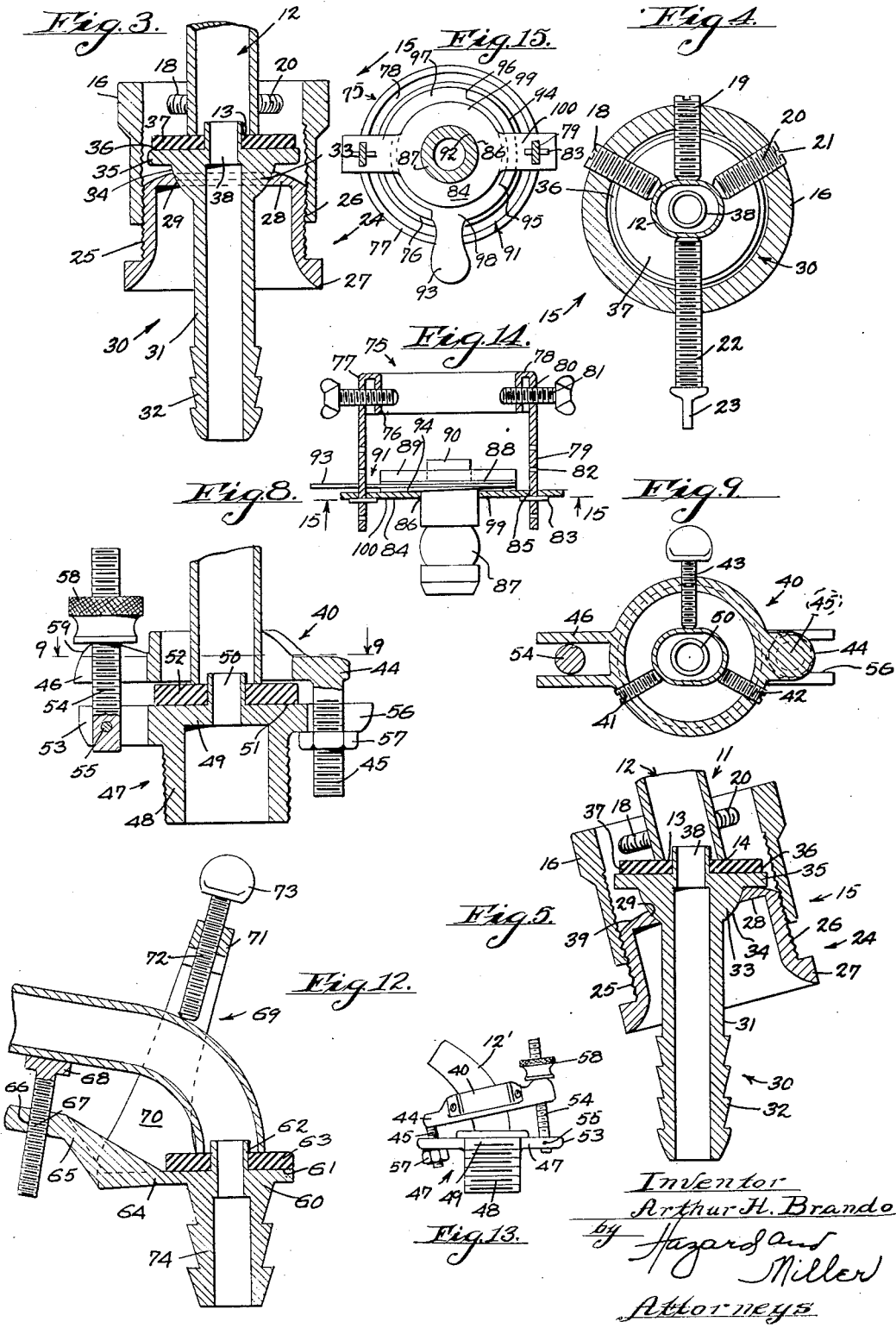

Patented Feb. 13, 1934

1,946,832

UNITED STATES PATENT OFFICE 1,946,832

FAUCET ADAPTER

Arthur H. Brandon, Los Angeles, Calif.

Application March 11, 1931. Serial No. 521,672

5 Claims. (Cl. 285—163)

My invention relates to faucet adapters, which devices are adapted for attaching a hose or the like to an ordinary water faucet.

An object of my invention is an attachment to a faucet or an adapter for attaching hose or the like in which a water tight seal is effected which will withstand substantially any hydraulic pressure to which the faucet is apt to be subjected and which will make a hydraulic connection from the faucet to the hose which will not slip off the faucet, no matter how great the pressure, and in which the adapter can for all practical purpose carry as high pressures as the faucet.

Another object and feature of my invention is making the adapter readily attachable, and detachable from the faucet so that the faucets will not be marred by having a permanent construction attached thereto except in cases in which it is desirable to leave part of the attachment on the faucet for frequent use.

Having in mind the above general features, the main constructional object of my invention is a faucet adapter or connection in which a liquid tight seal is made by the adapter against the discharge nozzle, orifice, or end of the faucet, and in which such seal may be made sufficiently tight to withstand all practical pressures to which the faucet may be subjected. In this connection a further object of my invention is to provide the adapter with a holding or retaining element which may be directly attached to the faucet. This may be of the readily attachable and detachable type or it may be a construction which is preferably left on the faucet. Cooperating with this I utilize a sealing ring or washer which may be secured to the holding or retaining element and tightly pressed against the open discharge end or nozzle of the faucet.

A further detailed object of my invention is in providing a guide tube which may be connected to a hose supporter or a hose bib and this guide tube centering the sealing element on the nozzle of the faucet. In this connection the sealing element in the form of a washer surrounds the guide tube and is itself supported on a base structure forming part of a hose connection or a hose bib and by means of the retaining element and a clamping element the sealing washer is pressed against the open nozzle of the faucet. In this connection I prefer to have some type of screw connection between the clamping and retaining element so that adjustable pressures may be had between the packing and the end of the faucet.

A further feature of my invention is providing a type of swivel attachment so that the hose connector or bib may project at right angles to the plane of the edge of the nozzle of the faucet no matter at what angle the retaining element may be attached to the faucet, as in many faucets this retaining element must be arranged at some angle considered in relation to the plane of the discharge nozzle of the faucet.

A further feature of my invention is providing an adapter which is not only suitable for a circular but will accommodate swivel or various unusual or angular shaped faucets.

In constructing my invention I prefer to make the retaining or holding element attachable to the faucet in the form of a ring larger in internal diameter than any faucet with which it is adapted to be used and attaching or centering this retaining ring by means of a plurality of radial set screws, such set screws being all in one plane. The clamping device also preferably comprises a ring having a screw threaded attachment to the retaining ring and in my preferred form the hose connector has a ball type of connection with the clamping ring to allow adjustment to the angle of the nozzle end of the faucet. The packing washer is supported on the hose connector, which hose connector has the guide tube extending into the faucet. With this type of construction the screw threaded connection preferably uses an internally threaded retaining ring and an externally threaded clamping ring. In other types, however, the clamping ring may be directly connected to the retaining or holding ring by means of clamping bolts.

In one simple form of my adapter I dispense with the retaining ring and attach the clamping ring with the packing washer and guide tube direct to the faucet by means of clamping bolts.

My invention in its various aspects is illustrated in the accompanying drawings, in which:

Fig. 3 is a vertical section on the line 3—3 of Fig. 1 in the direction of the arrows.

Fig. 4 is a transverse section on the line 4—4 of Fig. 2 in the direction of the arrows.

Fig. 5 is a section similar to Fig. 3 with the device attached to a beveled end faucet.

Fig. 8 is a section on the line 8—8 of Fig. 6 in the direction of the arrows.

Fig. 9 is a section on the line 9—9 of Fig. 6 in the direction of the arrows.

Fig. 12 is a section on the line 12—12 of Fig. 11 in the direction of the arrows.

Fig. 13 shows the method of attachment of the modification illustrated in Figs. 6 through 9, to a different style of faucet.

Fig. 14 is a vertical section of a further modification of my invention.

Fig. 15 is a plan of a rotatable cam and part of the supporting plate used with the construction of Fig. 14.

Figure 1:
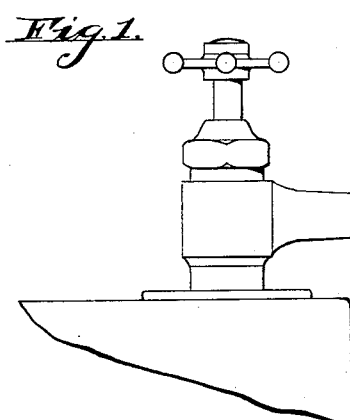
Fig. 1 is a side elevation taken in the direction of the arrow 1 of Fig. 2.
Figure 2:
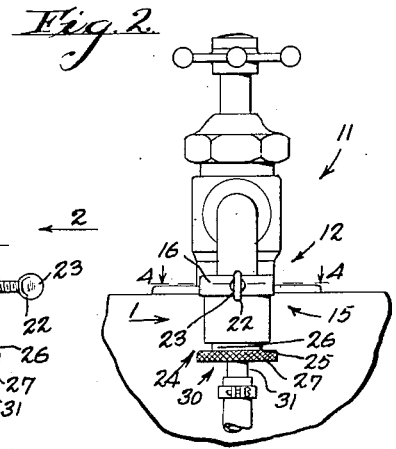
Fig. 2 is a front elevation taken in the direction of the arrow 2 of Fig. 1.
Figure 6:
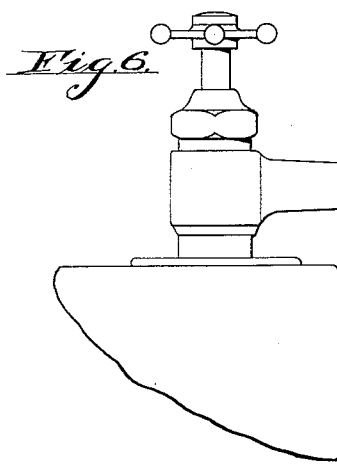
Fig. 6 is a side elevation of a modification taken in the direction of the arrow 6 of Fig. 7.
Figure 7:
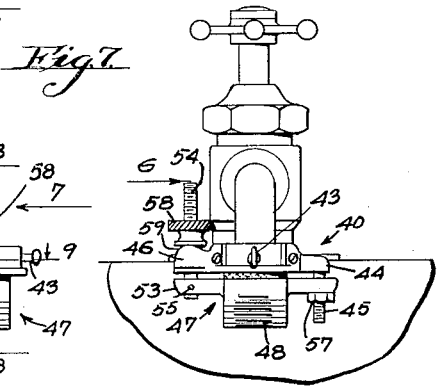
Fig. 7 is a front elevation taken in the direction of the arrow 7 of Fig. 6.

Dealing first with the construction of Figs. 1 through 5, a faucet is indicated by the numeral 11. This has a discharge end 12 with a nozzle opening 13. In Fig. 5 the nozzle has a bevel as indicated at 14, this bevel being at an angle to the axis of the faucet. In this construction the faucet is indicated as being slightly oval, but it is to be understood that such faucet is to be of substantially any configuration in cross section, and may be curved adjacent the nozzle or have an angular bend, or be of various other constructions, yet my adapter is designed to fit substantially any ordinary type of construction.

A holder or retainer is indicated at 15, this being in the form of a ring having a substantial upper section 16 and having set screws 18, 19, and 20, each having a screw driver kerf 21, and a longer set screw 22 which has a finger grip 23 at the end. I prefer in the usual construction to space the set screws 18, 20, and 22 at equal distances apart considered circumferentially of the retaining ring, and if the set screw 19 is used, this being optional, it is advisable to place this diametrically opposite the set screw 22. The retaining ring is placed over the discharge end of the faucet and the set screws adjusted so that the faucet is substantially centered in the retaining ring. This centering, however, is more or less unimportant, and if the retaining ring is to be used on the same faucet over and over again and removed when the adapter is not in use, it is only necessary to loosen the set screw 22 for removal of the retaining ring. The other set screws may be left permanently adjusted.

The clamping element designated generally at 24 is formed of a clamping ring 25, this having an externally threaded section 26 and a knurled rim 27. This rim, if desired, may be shaped for engagement by a wrench. The clamping ring has an inner end wall 28, such wall having a spherical shaped seat 29.

The hose connector designated generally at 30 is indicated as having a tubular stem 31 with serrations 32 for securing and attaching a hose, such fitting over the serrations. The connector also has a supporting and bearing section 33, which section has a ball or spherical shaped bearing surface 34 operating on the seat 29. A rim 35 extends outwardly from the bearing section and forms a large annular supporting surface 36, on which is located a packing washer or ring 37, this ring being centered by an upwardly extending guide tube 38, such tube extending through and above the packing washer. It is desirable to bevel or slope the upper surface 39 of the end wall 28 to accommodate the tilting of the stem 31.

In applying the adapter of Figs. 1 through 5, the clamping ring may be disconnected from the retaining ring or else threaded outwardly therein, giving sufficient clearance for inserting the ring partly over the faucet. The set screws are then adjusted to clamp the retaining ring tightly to the faucet, approximately centering the faucet in the ring, as above mentioned. The clamping ring is then screwed inwardly, this causing the packing washer to engage the edge of the faucet at the discharge nozzle and the action in screwing the clamping ring in place automatically forces the packing ring and the hose stem into proper adjustment with the faucet, the guide tube 38 being utilized to guide and more or less center the packing ring in the nozzle end of the faucet. It will be apparent that sufficient pressure may be exerted by the clamping ring to press the clamping washer which is usually of rubber or equivalent material, tightly against the end of the faucet with sufficient pressure to form a hydraulically tight connection. Therefore, when a fluid is discharged through the faucet no fluid can leak at the junction of the packing ring and the faucet, and there is also a tight seal between the packing ring and the guide tube, and between the packing ring and the bearing surface 36 on which it rests. Therefore, all the fluid is discharged from the faucet through the guide tube 38 and the tubular stem 31. It is to be noted that there is no fluid in the retaining ring and that the spherical bearing surfaces 29 and 34 do not need, therefore, to form a liquid-tight joint, but this spherical bearing is only to accommodate the inclined or tilting action of the tubular stem.

In the construction of Figs. 6 through 9 the retaining ring 40 is indicated as having set screws 41 and 42, each having a screw driver kerf, and being adapted to be permanently adjusted and to remain in adjustment when the ring is used on the same faucet. The third set screw 43 has a finger grip end for quick adjustment to attach and detach the ring. In this construction a lug 44 extends laterally from one side of the ring 40 and has a screw threaded stud 45 extending therefrom, this stud being parallel to the axis of the ring. At the opposite side there are a pair of projections 46, these being spaced from each other.

The clamping unit 47 is indicated as having a hose bib 48 and a head 49 with a guide tube 50 extending through the head. The surface 51 of the head forms a bearing for the packing washer 52, which bears thereon and encircles the guide tube 50. At one side of the clamping unit, and extending from one side of the head, there are a pair of ears 53 between which there is pivotally mounted a screw threaded stud or bolt 54, the pintle being indicated at 55. On the diametrically opposite side of the head there is a slot 56 to accommodate the stud 45. This stud is provided with a nut 57 which preferably is shaped to accommodate a wrench, whereas the stud 54 is provided with a nut 58 which is knurled for operation by the hand.

In manipulating the adapter of Figs. 6 through 9 the clamping ring is attached to the faucet by the set screws. The clamping unit is then connected in place by passing the bolt 45 through the slot 56 on one side of the unit, and by swinging the pivoted stud 54 to pass between the spaced projections 46 on the retaining ring. The nuts can then be adjusted so that an even pressure is brought to bear on the packing washer 52, the clamping unit being guided into position by the guide tube 50. It should be observed that the outer end of each of the projections 46 and the upper surface thereof merge into each other in a curved surface 59, which permits detaching the clamping unit 47 substantially instantaneously from the retaining ring 40 by pulling the stud 54 outwards from between the projections 46. Ordinarily this may be accomplished without the necessity of loosening the nut 58, although the nut may readily be loosened if necessary. This allows ready detaching of the clamping unit and also the replacement of this unit. It will be noted in this case that if the retaining ring is left on the faucet the stud 45 projects downwardly beyond the nozzle.

Fig. 13 shows the method of attachment of this modification of the invention to a faucet 12', in which the vertically extending portion of the spout is not of sufficient length to accommodate both the retaining ring 40 and the clamping unit 47, with the result that the end of the spout does not lie in a plane parallel to the axis of that portion of the spout upon which the retaining ring 40 must be secured. It will be observed, however, that the stud 54 is materially longer than is necessary for use in conjunction with the type of faucet illustrated upon Figs. 6 through 9. This permits the mounting of the retaining ring 40 out of parallelism with the plane of the end of the spout of the faucet 12', as illustrated upon Fig. 13, without interfering with retention of the clamping unit 47 substantially in that plane and compressed tightly against the extreme end of the spout when the nuts 57 and 58 are tightened.

Figure 10:
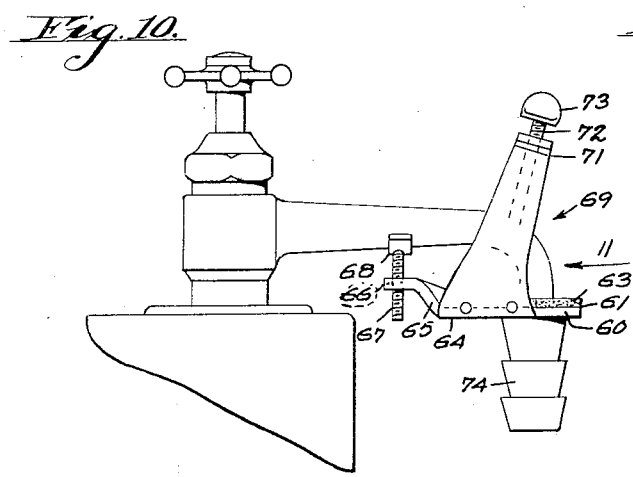
Fig. 10 is a side elevation taken in the direction of the arrow 10 of Fig. 11.
Figure 11:
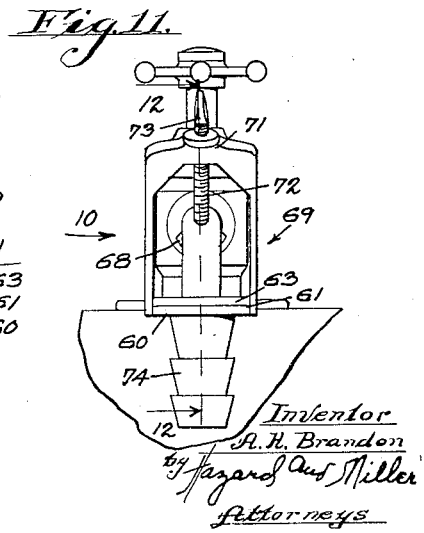
Fig. 11 is a front elevation taken in the direction of the arrow 11 of Fig. 10.

In the construction of Figs. 10, 11, and 12 there is no retaining or holding ring used. This construction is illustrated as having a head block 60 with a flat upper surface 61 and a guide tube 62 extending through the head. A packing washer 63 fits around the guide tube and bears on the seat 61.

This device is attached to the faucet by means of a laterally projecting plate 64 which has a projecting arm 65, this arm having a threaded perforation 66 through which extends an adjusting screw 67, which carries a shoe 68 adapted to engage the under side of a faucet. A clamping yoke 69 has two posts 70 with a bridging piece 71 connected therebetween, and through this bridging piece there extends the adjusting and clamping set screw 72, this having a finger grip end 73. This set screw is designed to engage the uper part of the faucet and draw or pull the head 60 with the packing washer thereon into close and tight engagement with the nozzle end of the faucet, thereby providing a leak-proof connection with the faucet. In this type of construction I have illustrated a stem 74 connected to the head, and adapted for attachment of a hose thereto.

It is to be understood that wherever desired in the actual construction I may use stems to which a hose may be attached and readily detached therefrom, if desired, and as an alternative construction I may use a hose bib, these parts being interchangeable for the particular use to which the adapter is put.

The construction illustrated in Figs. 14 and 15 is particularly adapted for hose spray attachments to faucets, and in this construction I employ a clamping ring 75. This ring is preferably made of bent metal having an inner section 76, an outer section 77 joined by a reverse curve 78. Formed integral with or attached to this ring are a pair of straps 79. The ring is provided with screw threaded openings 80 in which are threaded clamping bolts 81. The straps are provided with a series of perforations 82 which are designed to accommodate cotter pins 83, these cotter pins supporting a plate 84 having slots 85 to accommodate the straps 78.

This plate has a central opening 86 through which extends a tubular stem 87 to which a hose may be attached. This stem at the top has a metal washer 88 connected thereto and a rubber washer 89 on top of the metal washer; and extending through the metal washer and thereabove is the guide stem 90. A cam plate 91 is formed with a central opening 92 to encircle the stem and such cam plate is between the metal washer 88 and the plate 84. This cam plate has an operating handle 93 and is provided with two partial rims 94 forming cams, these cams having a low edge 95 engaging with the lower surface of the cam plate 91 and having a high terminating end 96. There are spaces 97 and 98 between the ends of the cam rims to allow the cam plate to lie flat on the plate 84, this plate having a circular portion 99 of less diameter than the inside edge of the cam rims, and these rims being adapted to engage the arm portions 100 of this plate.

The manner of using the faucet adapter of Figs. 14 and 15 is by clamping the set screws 81 on the faucet with the ring 75 in the desired position, then by means of adjusting the cotter pins 83 in the proper perforations the supporting plate 84 is adjusted so that the rubber washer 89 bears against the end of the faucet with the flat face of this plate bearing on the face of the supporting plate. Then by rotating the cam plate by the lever device 93 the cam rims bear on the arms 100 of the supporting plate 84 and thus press the metal washer 88 and the rubber washer 89 upwardly, forming a water tight seal with the end of the faucet. Then when the water is turned on in the faucet there is no leakage at the faucet. This makes a simple construction utilizing a cam action for obtaining this water tight seal.

Various changes may be made in the details of construction without departing from the spirit or scope of the invention as defined by the appended claims.

I claim:

1. A faucet adapter comprising a hose connector having a guide tube and a packing washer surrounding the tube, means to attach the connector to a faucet with the washer bearing against the discharge end of the faucet, said means forcing the connector to accommodate itself to various angles of the end of the faucet in reference to the axial line of the faucet adjacent its end.

2. A faucet adapter having a tubular stem with a head and a guide tube extending through the head, a packing washer seated on the head and surrounding the said tube, means to attach the stem to a faucet with the washer bearing against the discharge end of the faucet, said means forcing the stem and the washer to occupy various angles in reference to the axial line of the faucet adjacent its discharge end.

3. A hose adapter comprising in combination a retaining ring, means to detachably connect said ring to a faucet, a clamping element, a hose connector having a ball and socket bearing on said clamping element, the hose connector having a packing washer, means to attach the clamping element to the retaining ring to press the washer against the discharge end of a faucet, the said ball and socket connection accommodating the washer to various angles of the discharge end of the faucet in relation to the exterior structure of the faucet.

4. A hose adapter comprising in combination a retaining ring, a plurality of set screws to attach and adjust said ring on the exterior of a faucet, said screws being adapted to engage a faucet adjacent its discharge end, a clamping element, a hose-connector having a packing washer mounted thereon, means to interconnect the clamping element and the retaining ring to press the washer against the discharge end of a faucet, and a ball and socket bearing mounted in the clamping element accommodating the washer to various angles of the plane of the discharge end of the faucet in relation to the position of the retaining ring.

5. A hose adapter comprising in combination a retaining ring with means to detachably connect same to the exterior of a faucet, a clamping unit having a screw threaded engagement therewith, a hose connector having a ball and socket connection with the clamping unit, a stem connected to the ball and having a head with a packing washer mounted thereon, the said washer being adapted to engage the edge of a faucet at its discharge end.

ARTHUR H. BRANDON.